(12) United States Patent
Ogawa et al.

(10) Patent No.: US 6,851,709 B2
(45) Date of Patent: Feb. 8, 2005

(54) MULTISTAGE-INFLATING TYPE HYBRID INFLATOR

(75) Inventors: Akihisa Ogawa, Hyogo (JP); Masayuki Yamazaki, Hyogo (JP); Mikio Yabuta, Hyogo (JP); Masayuki Ueda, Kanagawa (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/226,167

(22) Filed: Aug. 23, 2002

(65) Prior Publication Data

US 2003/0047923 A1 Mar. 13, 2003

Related U.S. Application Data

(60) Provisional application No. 60/360,008, filed on Feb. 28, 2002.

(30) Foreign Application Priority Data

Aug. 31, 2001 (JP) .................................. 2001-263334

(51) Int. Cl.[7] .............................................. B60R 21/26
(52) U.S. Cl. ...................... 280/736; 280/741; 280/742
(58) Field of Search ............................... 280/736, 737, 280/740, 741, 742

(56) References Cited

U.S. PATENT DOCUMENTS

| | | | | |
|---|---|---|---|---|
| 3,758,131 A | * | 9/1973 | Stephenson et al. | 280/735 |
| 5,601,309 A | | 2/1997 | Bender et al. | 280/737 |
| 5,794,973 A | | 8/1998 | O'Loughlin et al. | |
| 6,019,389 A | * | 2/2000 | Burgi et al. | 280/736 |
| 6,068,291 A | | 5/2000 | Lebaudy et al. | 280/736 |
| 6,168,200 B1 | * | 1/2001 | Greist et al. | 280/736 |
| 6,206,414 B1 | | 3/2001 | Cook et al. | 280/734 |
| 6,213,503 B1 | | 4/2001 | Zimbrich et al. | 280/736 |
| 6,231,079 B1 | | 5/2001 | Perotto et al. | 280/737 |
| 6,253,683 B1 | * | 7/2001 | Fukabori | 102/530 |
| 6,289,820 B1 | * | 9/2001 | Anacker et al. | 102/530 |
| 6,314,888 B1 | * | 11/2001 | Muller et al. | 102/530 |
| 6,607,213 B2 | * | 8/2003 | Yamamori et al. | 280/736 |

FOREIGN PATENT DOCUMENTS

| | | |
|---|---|---|
| JP | 8-253095 A | 10/1996 |
| JP | 8-253100 A | 10/1996 |
| JP | 08-282427 A2 | 10/1996 |
| JP | 9-506058 A | 6/1997 |
| JP | 11-48905 A | 2/1999 |
| JP | 2000-354756 A | 12/2000 |
| WO | 95/30560 A1 | 11/1995 |
| WO | 00/32448 A1 | 6/2000 |
| WO | WO01/07300 A1 | 1/2001 |

* cited by examiner

*Primary Examiner*—Paul N. Dickson
*Assistant Examiner*—Laura B. Rosenberg
(74) *Attorney, Agent, or Firm*—Birch, Stewart, Kolasch & Birch, LLP.

(57) ABSTRACT

The present invention provides a hybrid inflator capable of adjusting an amount of a pressurized medium and a material of a gas generating agent to meet the requirements.

An outer shell of a first gas generating chamber 130 is formed by an inflator housing 101 and a second gas generating chamber housing 146, and an outer shell of a second gas generating chamber 140 is formed by the second gas generating chamber housing 146. For this reason, even when the requirement for downsizing and reducing weight is met, an amount of a gas generating agent does not have to be reduced.

14 Claims, 9 Drawing Sheets

MULTISTAGE-INFLATING TYPE HYBRID INFLATOR

This application claims priority on provisional Application No. 60/360,008 filed on Feb. 28, 2002, the entire contents of which are hereby incorporated by reference.

BACKGROUND OF THE INVENTION

The present invention relates to a hybrid inflator suitable for an inflating-type safety system of motor vehicles, and an air bag system using the same inflator.

PRIOR ART

With the development of an inflator for an inflating-type safety system of motor vehicles, a hybrid inflator using both a pressurized gas and a solid gas generating agent is attracting attention. A main design requirement for a hybrid inflator is that the inflator inflates an air bag by a predetermined amount in a predetermined time so that the air bag is effectively activated. Various proposals concerning a structure to meet the requirement have heretofore been made (for example, as referred in JP-A 08-282427). From the viewpoint of weight reduction of a vehicle, such a hybrid inflator is required to be small in size and light in weight. Further, from the viewpoint of securing safety of a passenger, it is required to inflate and develop an air bag up to a predetermined volume rapidly and unfailingly. For this reason, while meeting the requirement for downsizing and reducing weight, it is demanded to secure necessary charged amounts of a pressurized medium and a gas generating agent in accordance with the requirements such as a kind of an automobile or the like.

BRIEF SUMMARY OF THE INVENTION

An object of the present invention is to provide a hybrid inflator in which the requirement for downsizing and reducing weight is met and an amount of a pressurized medium and an amount of a gas generating agent can properly be adjusted without deteriorating a function of an inflator, and an air bag system using the same inflator.

The present invention provides, as a means for solving the above problem, a multistage inflating-type hybrid inflator comprising an inflator housing, at least two gas generating chambers provided with a gas generating agent which is stored in the inflator housing, and an ignition chamber provided with an igniter connected to at least two gas generating chambers, wherein a pressurized medium is charged in a space portion except for the ignition chamber inside the inflator housing, a diffuser portion having a gas discharging port is provided at one end of the inflator housing, and a principal rupturable plate closing an outflow passage of the pressurized medium between the diffuser portion and the inflator housing is provided, and the at least two gas generating chambers are formed by axially dividing the interior of the inflator housing into at least two sections with a partition wall or a gas generating chamber housing provided inside the inflator housing.

In the present invention, the at least two gas generating chambers can occupy the whole space in a radial sectional view of the inflator housing. In the present invention, an inner wall surface of the inflator housing can be utilized as a wall (an outer shell) of the gas generating chamber.

Also, as another means for solving the above-described problem, in the present invention, the at least two gas generating chambers may be formed by at least two gas generating chamber housings provided in the inflator housing independently.

In the present invention, the at least two gas generating chambers occupy part of the space in a radial sectional view of the inflator housing.

Further, as another means for solving the above-described problem, in the above invention, the at least two gas generating chambers are defined by the inflator housing and at least one gas generating chamber housing provided inside the inflator housing.

In this invention, at least two gas generating chambers may occupy the whole space in a radial sectional view of the inflator housing. In this invention, an inner wall surface of the inflator housing can be utilized as a wall (an outer shell) of the gas generating chamber.

By forming at least two gas generating chambers as described in the above respective inventions, charge amounts of the pressurized medium and the gas generating agent can easily be adjusted to desired ranges. Further, the volume which is occupied by the at least two gas generating chambers in the axial direction in the inflator housing can be reduced or the axial length of the inflator housing can be shortened, so that, the hybrid inflator can be downsized correspondingly.

The present invention provides, as another means for solving the above-described problem, a multistage inflating-type hybrid inflator comprising an inflator housing, at least two gas generating chambers provided with a gas generating agent which is stored in the inflator housing, and an ignition chamber provided with an igniter connected to the at least two gas generating chambers, wherein a pressurized medium is charged in a space portion except for the ignition chamber inside the inflator housing, the at least two gas generating chambers provided with the gas generating agent and the ignition chamber provided with the igniter connected to the at least two gas generating chambers are arranged in both or one of the spaces formed by radially dividing the inflator housing into two sections with a partition plate, the at least two gas generating chambers are formed by axially dividing the interior of the inflator housing into at least two sections with a partition wall or a gas generating chamber housing provided inside the inflator housing, and one or at least two gas passages connecting the two spaces, one or at least two gas discharging holes connecting to the outflow passage of the pressurized medium, and a principal rupturable plate closing the outflow passage of the pressurized medium are provided in the partition plate.

In this invention, the at least two gas generating chambers may occupy the whole space in a radial sectional view of the inflator housing. In this invention, an inner wall surface of the inflator housing can be utilized as a wall (an outer shell) of the gas generating chamber.

Also, as another means for solving the above-described problem, in the above invention, the at least two gas generating chambers are formed by at least two gas generating chamber housings provided inside the inflator housing independently.

In this invention, the at least two gas generating chambers may occupy part of the space in a radial sectional view of the inflator housing.

Also, as another means for solving the above-described problem, in this invention, the at least two gas generating chambers are defined by the inflator housing and at least one gas generating chamber housing provided inside the inflator housing.

In this invention, the at least two gas generating chambers may occupy the whole space in a radial sectional view of the inflator housing. In this invention, an inner wall surface of the inflator housing can be utilized as a wall (an outer shell) of the gas generating chamber.

By forming at least two gas generating chambers as described in the above respective inventions, charged amounts of a pressurized medium and a gas generating agent can easily be adjusted to desired ranges. Further, the volume which is occupied by the at least two gas generating chambers in the axial direction in the inflator housing can be reduced or the axial length of the inflator housing can be shortened, and therefore, the hybrid inflator can be downsized correspondingly. As described above, particularly, in a structure in which the inflator housing is partitioned and divided into first and second chambers by a partition wall, if the partition wall exists at a central portion of the inflator housing, the length of the gas generating chamber in the axial direction is restricted so that the length of the gas generating chamber in the axial direction can be advantageously shortened. Further, if the partition wall exists in the central portion of the inflator housing, the length of the inflator housing in the axial direction is made longer by the thickness of the partition wall, but the diameter (or width) of the inflator housing is made smaller to improve pressure resisting performance. Therefore, the thickness of the inflator housing can be thinner and weight-reduction can be achieved correspondingly.

When the pressurized medium used in the present invention has a composition comprising oxygen and an inert gas such as argon or helium (nitrogen is also included in the inert gas in the present invention), the oxygen works to convert carbon monoxide and hydrogen generated due to combustion of a gas generating agent as a gas generating means into carbon dioxide and water vapor, and the argon works to promote the thermal expansion of the pressurized medium. Helium is preferably included in the pressurized medium since the leakage of the pressurized medium can be detected easily, and consequently distribution of imperfect products can be prevented. A charging pressure of the pressurized medium (=pressure inside the inflator housing) is preferably 10,000 to 70,000 kPa and more preferably, 20,000 to 50,000 kPa. The pressurized medium may, or may not include oxygen, and when oxygen is included, it is preferable that the maximum amount is 30 mol %.

As the gas generating agent stored in the gas generating chamber and used in the present invention, for example, a gun propellant can be used. As the gun propellant, a single-base gun propellant, a double-base gun propellant and a triple-base gun propellant can be used. In addition to these propellants, it is possible to use a gun propellant obtained by mixing a secondary explosive, a binder, a plasticizer, a stabilizer and the like, and molding the resultant mixture in a desired shape.

The secondary explosive can include hexahydrotrinitrotriazine (RDX), cyclotetramethylene tetranitramine (HMX), pentaerithritol tetranitrate (PETN), and triaminoguanidine nitrate (TAGN) and the like. For example, when a gas generating agent using RDX as a secondary explosive is burnt in an oxygen-absent atmosphere under a pressure of 20,670 kPa and at a combustion temperature of 3348 K, formed gas in a combustion gas comprises 33 mol % of nitrogen, 25 mol % of carbon monoxide, 23 mol % of water vapor, 8 mol % of carbon dioxide and other gas components.

The bonding agent can include cellulose acetate, cellulose acetate butylate, cellulose acetate propiolate, ethyl cellulose, polyvinyl acetate, azide polymer, polybutadiene, hydrogenated polybutadiene and polyurethane and the like; the plasticizer can include trimethylolethane trinitrate, butantriol trinitrate, nitroglycerine, bis (2,2-dinitropropyl) acetal/formal, glycidyl azide and acetyltriethyl citrate and the like; and the stabilizer can include ethlcentralite, diphenylamine and resocinol and the like.

In a preferable ratio of the secondary explosive to the binding agent, plasticizer and stabilizer, secondary explosive is about 50 to 90 wt. % and the binder, plasticizer and stabilizer in all are about 10 to 50 wt. %.

It is difficult in some cases to burn the gas generating agent of the above-described composition under normal pressure. However, in the hybrid inflator according to the present invention, the interior thereof is maintained at a high pressure in advance, the gas generating agents can be burnt stably and smoothly.

In addition, as the gas generating agent, for example, it is possible to use a material including the fuel and the oxidizing agent, or the fuel, the oxidizing agent and the slag-forming agent, being mixed with the binding agent if required, and formed into a desired shape. If such a gas generating agent is used, a gas generated by combustion of the agent can be used for developing the air bag together with the pressurized medium. Especially when the gas generating agent including the slag-forming agent is used, an amount of mist discharged from the inflator can be largely reduced.

Preferably, the fuel can be one or at least two selected from guanidine derivatives such as nitroguanidine (NQ), guanidine nitrite (GN), guanidine carbonate, amino nitroguanidine, amino guanidine nitrite, amino guanidine carbonate, diamino guanidine nitrite, diamino guanidine carbonate, or triamino guanidine nitrite. As a fuel, one or at least two materials selected from the group comprising tetrazole and tetrazole derivative can be used.

As the oxidizing agent, one or more materials selected from the group comprising strontium perchlorate, potassium nitrate, ammoniumnitrate, potassiumperchlorate, copper oxide, ferrous oxide, a basic copper nitrate are preferably used. A preferable compounding amount of the oxidizing agent is 10 to 80 parts by weight, and more preferably, 20 to 50 parts by weight with respect to 100 parts by weight of the fuel.

As the slag-forming agent, one or at least two materials selected from the group comprising acid clay, talc, bentonite, diatomaceous earth, kaolin, silica, alumina, sodium silicate, silicon nitride, silicon carbide, hydrotalsite, and a mixture thereof are preferably used. A preferable amount of the slag-forming agent is 0 to 50 parts by weight, and more preferably, 1 to 10 parts by weight with respect to 100 parts by weight of the fuel.

As the binding agent, one or more materials selected from the group comprising sodium salt of carboxymethylcellulose, hydroxyethyl cellulose, starch, polyvinyl alcohol, guar gum, microcrystal cellulose, polyacrylamide and calcium stearate are preferably used. A preferable amount of the binding agent is 0 to 30 parts by weight, and more preferably, 3 to 10 parts by weight with respect to 100 parts by weight of the fuel.

The present invention further provides an air bag system comprising an activation signal-outputting means including an impact sensor and a control unit, and a module case in which the above-described multistage inflating-type hybrid inflator and an air bag are accommodated.

In the present invention, the term "a gas generator" means a unit having a gas generating function of generating a high temperature combustion gas due to combustion of the gas generating means (gas generating agent) stored in the gas generator housing (gas generating chamber), thereby allowing the high temperature combustion gas to flow into the inflator housing. And the hybrid inflator includes the gas generator inside a inflator housing thereof.

The hybrid inflator of the present invention can meet the requirement of downsizing and reducing weight, and can adjust an amount of the pressurized medium and an amount of the gas generating agent properly according to the requirements without deteriorating the function for an inflator.

DETAILED DESCRIPTION OF THE INVENTION

Figure 1:
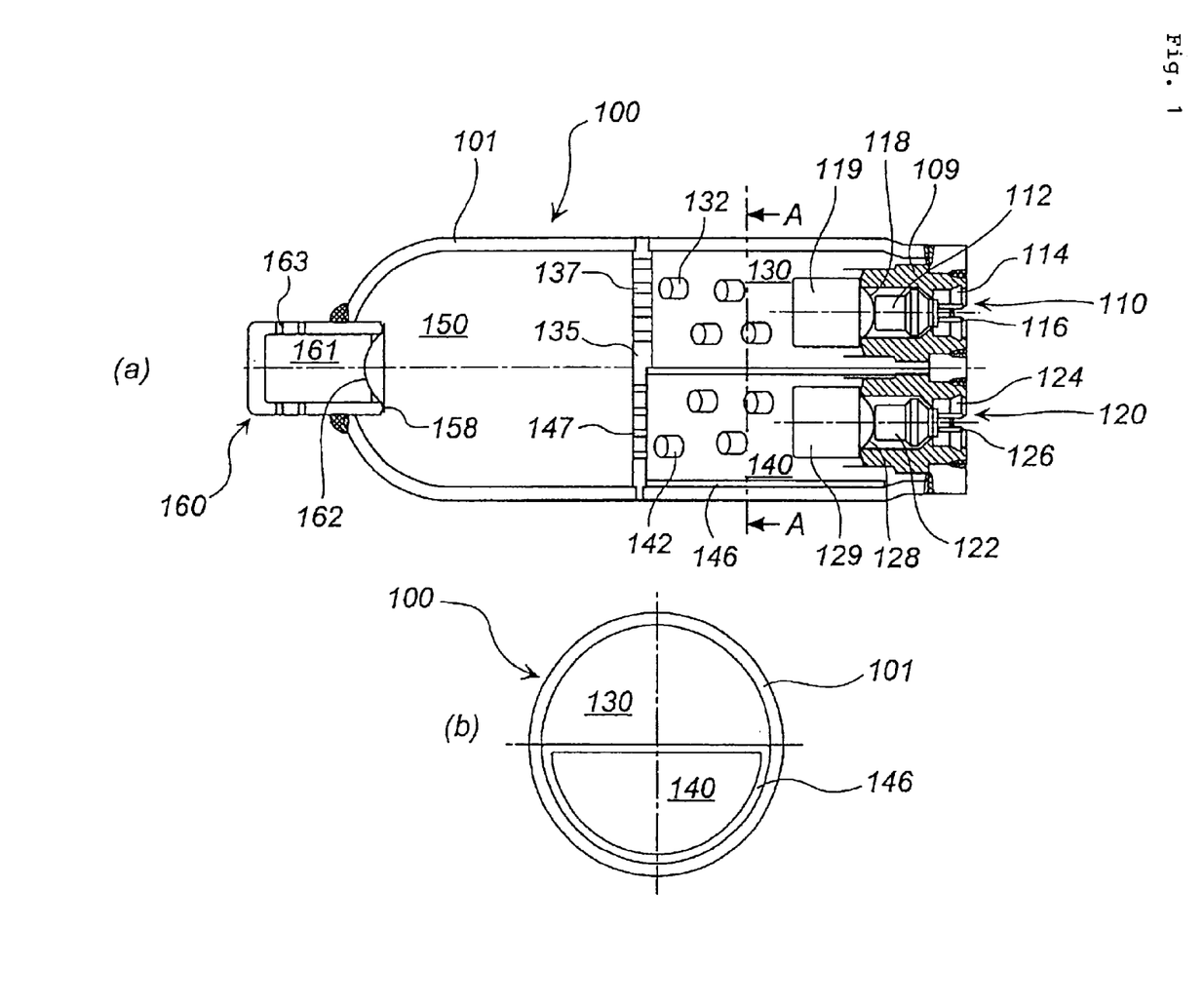
FIG. 1 is an axial sectional view of a hybrid inflator of the present invention.

One embodiment of the present invention will be explained with reference to the drawings. FIG. 1(a) is an axial sectional view of a hybrid inflator 100 of the present invention, and FIG. 1(b) is a sectional view cut along A—A in the direction shown by the arrows in FIG. 1(a). In this case, FIG. 1(b) is used only for explaining an arrangement of gas generating chambers.

An inflator housing 101 comprises a cylindrical pressure-resisting container, and an inner space 150 is charged with a pressurized medium and maintained at a high pressure. The pressurized medium is usually charged from a thin hole formed in a boss 109 or the like joined to the inflator housing 101 or one end portion of the inflator housing 101, and the thin hole is closed with a sealing pin after the inflator housing is filled with the pressurized medium.

The boss 109 is provided with a first ignition chamber 110 and a second ignition chamber 120, a first igniter 112 is accommodated and fixed in the first ignition chamber 110 and a second igniter 122 is accommodated and fixed in the second ignition chamber 120. The numerals 114 and 124 denote connectors, and the numerals 116 and 126 denote conductive pins.

A first gas generating chamber 130, whose outer shell is formed by the inflator housing 101, part of a wall of a second gas generating chamber housing 146 and a partition wall 135, is disposed in the axial extension line of the first ignition chamber 110, and a required amount of a first gas generating agent 132 is stored in the first gas generating chamber 130.

A first rupturable plate 118 closes between the first ignition chamber 110 and the first gas generating chamber 130, and a flame-transferring means 119 is disposed at a position where the first gas generating chamber 130 contacts the first rupturable plate 118. The flame-transferring means 119 comprises a cup made of aluminum and a transfer charge charged therein.

The partition wall 135 is provided with a required number of first communication holes 137 for discharging a combustion gas generated by combustion of the first gas generating agent 132, and the holes are opened in the axial direction of the inflator housing 101. The diameter of the first communication hole 137 is adjusted to such a size that the first gas generating agent 132 cannot leak out, and a screen comprising a wire mesh or the like may be disposed inside or outside the first communication hole 137.

In FIG. 1(a), one partition wall 135 is used for the first gas generating chamber 130 and the second gas generating chamber 140. Instead, two partition walls may be used, and a retainer having a structure shown in FIGS. 4 to 6 may be used.

A second gas generating chamber 140, whose outer shell is formed by the inflator housing 101, the second gas generating chamber housing 146 and the partition wall 135, is disposed in the axial extension line of the second ignition chamber 120, and a required amount of a second gas generating agent 142 is stored in the second gas generating chamber 140.

The first gas generating chamber 130 and the second gas generating chamber 140 are separated along the axial direction as shown in FIG. 1(a), and they are adjacent radially to each other. Further, as shown in FIG. 1(b), the chambers occupy the whole space in the radial sectional view of the inflator housing 101.

A second rupturable plate 128 closes between the second ignition chamber 120 and the second gas generating chamber 140, and a flame-transferring means 129 is disposed at a position where the second gas generating chamber 140 contacts the second rupturable plate 128. The flame-transferring means 129 comprises a cup made of aluminum or the like and a transfer charge charged therein.

A required number of second communication holes 147 for discharging a combustion gas generated by combustion of the second gas generating agent 142 are provided in the partition wall 135, and the holes are opened in the axial direction of the inflator housing 101. The diameter of the second communication hole 147 is adjusted to such a size that the second gas generating agent 142 cannot leak out, and a screen comprising a wire mesh or the like may be disposed inside or outside the second communication hole 147.

A diffuser portion 160 having a required number of gas discharging ports 163 for discharging a pressurized medium and a combustion gas is provided at the other end portion of the inflator housing 101. The diffuser portion 160 is welded and fixed to the inflator housing 101 by a laser welding, a resistance welding, an electron beam welding or the like.

Since an inner space 161 of the diffuser portion 160 and an inner space 150 of the inflator housing 101 are separated from each other by a principal rupturable plate 162, the inner space 161 is maintained in a normal pressure. The principal rupturable plate 162 is welded and fixed to the diffuser portion 160 at a brim (a peripheral edge portion of an opening portion) 158 by a laser welding, a resistance welding, an electron beam welding or the like. In this case, a filter member for removing mist or the like can be arranged to contact the gas discharging ports 163 inside the diffuser portion 160. As the filter member, a wire mesh, a punching metal or the like can be used.

Incidentally, in the hybrid inflator 100 shown in FIGS. 1(*a*) and 1(*b*), the first gas generating chamber 130 and a second gas generating chamber 140 are defined axially by the inflator housing 101 and the second gas generating chamber housing 146. Alternatively, two gas generating chambers can be defined by disposing one rectangular partition member (partition wall) in the axial direction. Further, three or four or more gas generating chambers can be defined by combining at least two partition members (partition walls) and a gas generating chamber housing and disposing them axially.

In the hybrid inflator 100 shown in FIGS. 1(*a*) and 1(*b*), the operational effects such as the following (1) to (3) can be obtained on the basis of its structure.

(1) A volume of the gas generating chamber inside the inflator housing 101 can be made large, and thereby, even when the axial length of the inflator housing 101 and the diameter thereof are made small, a sufficient volume for charging the gas generating agent and the pressurized medium can be secured, so that it is unnecessary to reduce a charged amount of the gas generating agent or the pressurized medium accompanying with downsizing the hybrid inflator.

(2) The volume of at least two gas generating chambers occupying the inflator housing axially can be made small, or the axial length thereof can be shortened, so that the inflator housing can be smaller correspondingly.

(3) When the inner wall of the inflator housing 101 is utilized as the outer shell of the gas generating chamber, a weight of the inflator housing can be reduced as compared with a case that a gas generating chamber housing is provided independently from the inflator housing.

Figure 2:
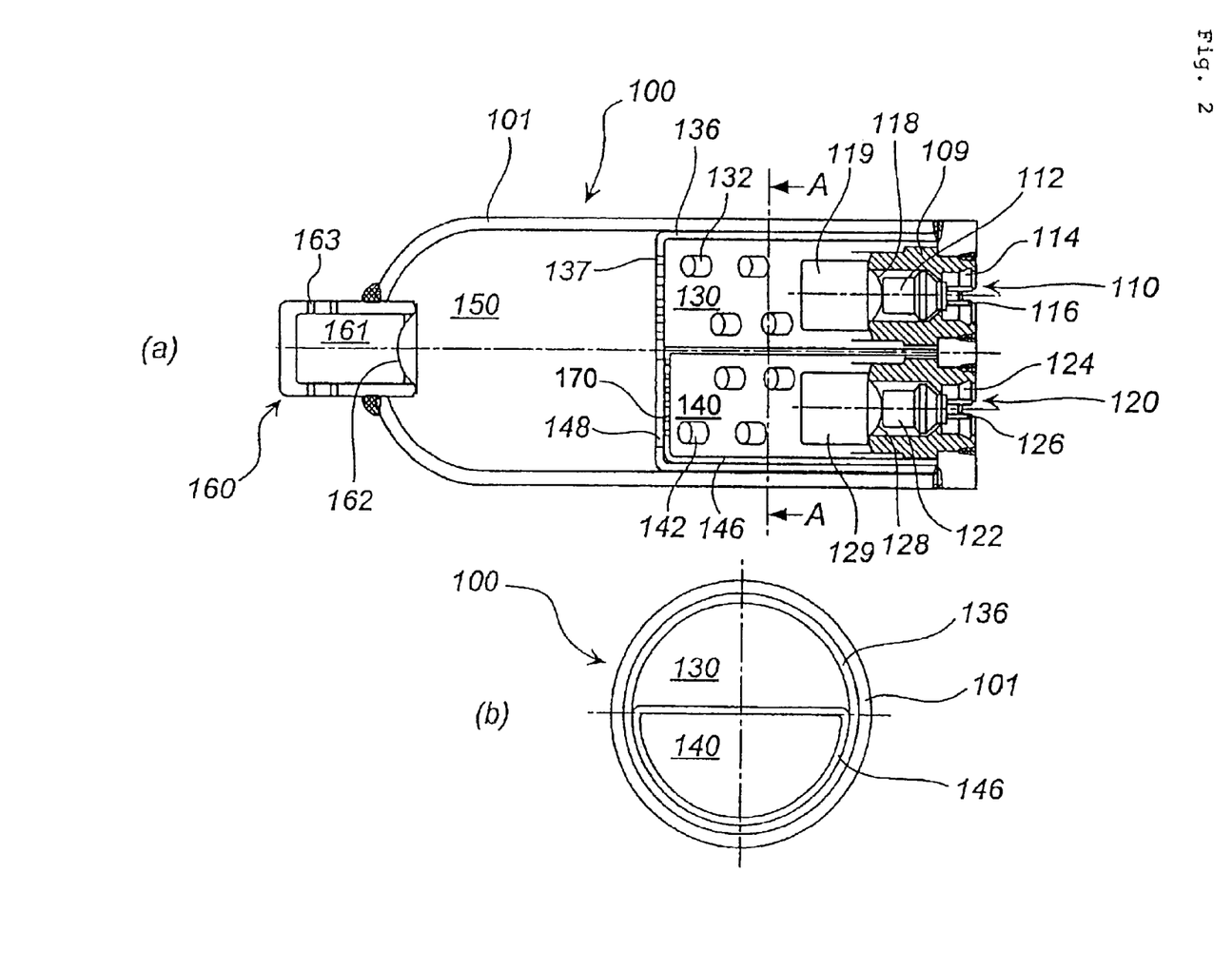
FIG. 2 is an axial sectional view of a hybrid inflator according to another embodiment of the present invention.

Another embodiment which is a modification of the hybrid inflator 100 in FIG. 1 will be explained below with reference to FIG. 2. A hybrid inflator in FIG. 2 is different from that in FIG. 1 only in the arrangements of gas generating chambers, so that the same portions other than the above are denoted by the same numerals as these in FIG. 1. FIG. 2(*a*) is an axial sectional view of a hybrid inflator of the present invention, and FIG. 2(*b*) is a sectional view cut along A—A in the direction shown by the arrows in FIG. 2(*a*). In this case, FIG. 2(*b*) is used only for explaining the arrangement of gas generating chambers.

The first gas generating chamber 130 and the second gas generating chamber 140 are separated along the axial direction as shown in FIG. 2(*a*), and they are adjacent radially to each other. Further, as shown in FIG. 2(*b*), the chambers occupy the whole space in the radial sectional view of the inflator housing 101.

An outer shell of the first gas generating chamber 130 is formed by a first gas generating chamber housing 136 and a second gas generating chamber housing 146, and an outer shell of the second gas generating chamber 140 is formed by the second gas generating chamber housing 146. Respective end surfaces of the first gas generating chamber housing 136 and the second gas generating chamber housing 146 which face the inner space 150 contact with each other.

A required number of first communication holes 137 for discharging a combustion gas generated by combustion of the first gas generating agent 132 are provided in an end surface facing the inner space 150 of the first gas generating chamber housing 136 and the first gas generating chamber 130, and the holes are opened in the axial direction of the inflator housing 101. The diameter of the first communication hole 137 is adjusted to such a size that the first gas generating agent 132 cannot leak out, and a screen comprising a wire mesh or the like may be disposed inside or outside the first communication hole 137.

A required number of second communication holes 170 for discharging a combustion gas generated by combustion of the second gas generating agent 142 are provided at an end surface of the second gas generating chamber housing 146 facing the inner space 150, and the holes are opened in the axial direction of the inflator housing 101. The diameter of the second communication hole 170 is adjusted to such a size that the second gas generating agent 142 cannot leak out. Further, a third communication hole 148 which allows communication between all of a plurality of second communication holes 170 and the inner space 150 is provided in an end surface of the first gas generating chamber housing 136 facing the second communication holes 147. The second communication holes 170 and the third communication hole 148 contact each other, and a screen comprising a wire mesh or the like can be disposed inside or outside these communication holes.

Incidentally, the hybrid inflator 100 shown in FIGS. 2(*a*) and 2(*b*) can be partitioned to three or four or more gas generating chambers by arranging one or at least two independent gas generating chamber housings separately.

In the hybrid inflator 100 shown in FIGS. 2(*a*) and 2(*b*), the operational effect such as the above-described (1) and (2) can be obtained on the basis of its structure.

Figure 3:
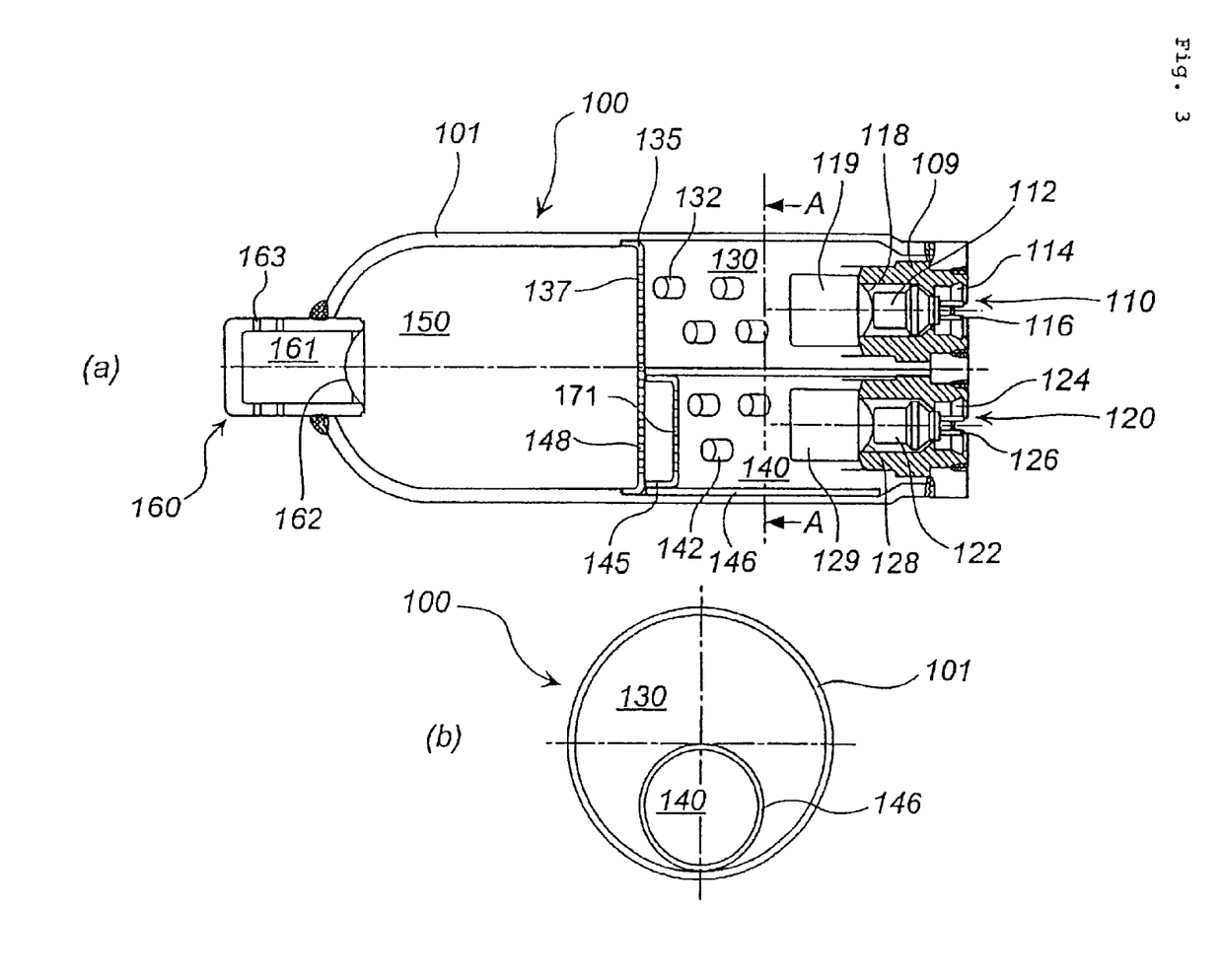
FIG. 3 is an axial sectional view of a hybrid inflator according to another embodiment of the present invention.

Another embodiment of the hybrid inflator 100 which is a modification of that in FIG. 1 will be explained below with reference to FIG. 3. Since a hybrid inflator in FIG. 3 is different from that in FIG. 1 only in the arrangement of gas generating chambers, the same portions other than the above as these in FIG. 1 are denoted by the same numerals. FIG. 3(*a*) is an axial sectional view of a hybrid inflator of the present invention, and FIG. 3(*b*) is a sectional view cut along A—A in the direction shown by the arrows in FIG. 3(*a*). In this case, FIG. 3(*b*) is used only for explaining the arrangement of gas generating chambers.

A first gas generating chamber 130 and a second gas generating chamber 140 are separated along the axial direction as shown in FIG. 3(*a*), and they are adjacent radially to each other. Further, as shown in FIG. 3(*b*), the second gas generating chamber 140 is disposed to be enclosed by the first gas generating chamber 130, and the chambers occupy the whole space in the radial sectional view of the inflator housing 101.

An outer shell of the first gas generating chamber 130 is formed by the inflator housing 101, the entire wall of a second gas generating chamber housing 146 and a first partition wall 135, and an outer shell of a second gas generating chamber 140 is formed by the second gas generating chamber housing 146 and a second retainer 145.

Incidentally, the hybrid inflator 100 shown in FIGS. 3(*a*) and 3(*b*) can be partitioned into three or four or more gas generating chambers by disposing one or at least two independent gas generating chamber housings separately.

In the hybrid inflator 100 shown in FIGS. 3(*a*) and 3(*b*), the operational effect such as the above-described (1) to (3) can be obtained on the basis of its structure.

Next, the operations of the hybrid inflators 100 shown in FIG. 1 to FIG. 3 will be explained. Although the first igniter 112 and the second igniter 122 can be activated simultaneously, in the following, a case such that the first igniter 112 is first activated and the second igniter 122 is activated with a delay therefrom will be explained.

When a vehicle collides, after the first igniter 112 is activated and ignited by an activation signal-outputting means to rupture the first rupturable plate 118, the transfer charge 119 is ignited and burnt to generate a high-temperature gas (flame), and the first gas generating agent 132 in the first gas generating chamber 130 is ignited and burnt by the flame, thereby generating a high-temperature gas. The high-temperature gas flows out of the first communication holes 137 to form a mixed gas together with the pressurized medium so that the mixed gas is filled in the inner space 150.

Thereafter, the pressure inside the inner space 150 is increased by the mixed gas to rupture the principal rupturable plate 162 rapidly. Consequently, the mixed gas is instantaneously ejected from the gas discharging ports 163 via the ruptured principal rupturable plate 162 to inflate the air bag.

The second igniter 122 is activated and ignited with a slight delay from the activation and ignition of the first igniter 112 and the second rupturable plate 128 is ruptured, so that the second gas generating agent 142 in the second gas generating chamber 140 is ignited and burnt to generate a high-temperature gas. The high-temperature gas flows out of the second communication holes 171 (the second communication holes 171 and the third communication hole 148 in FIG. 3) to form a mixed gas together with the remaining pressurized medium, so that the mixed gas is ejected from the gas discharging ports 163 via the ruptured principal rupturable plate 162 to further inflate the air bag.

Figure 4:
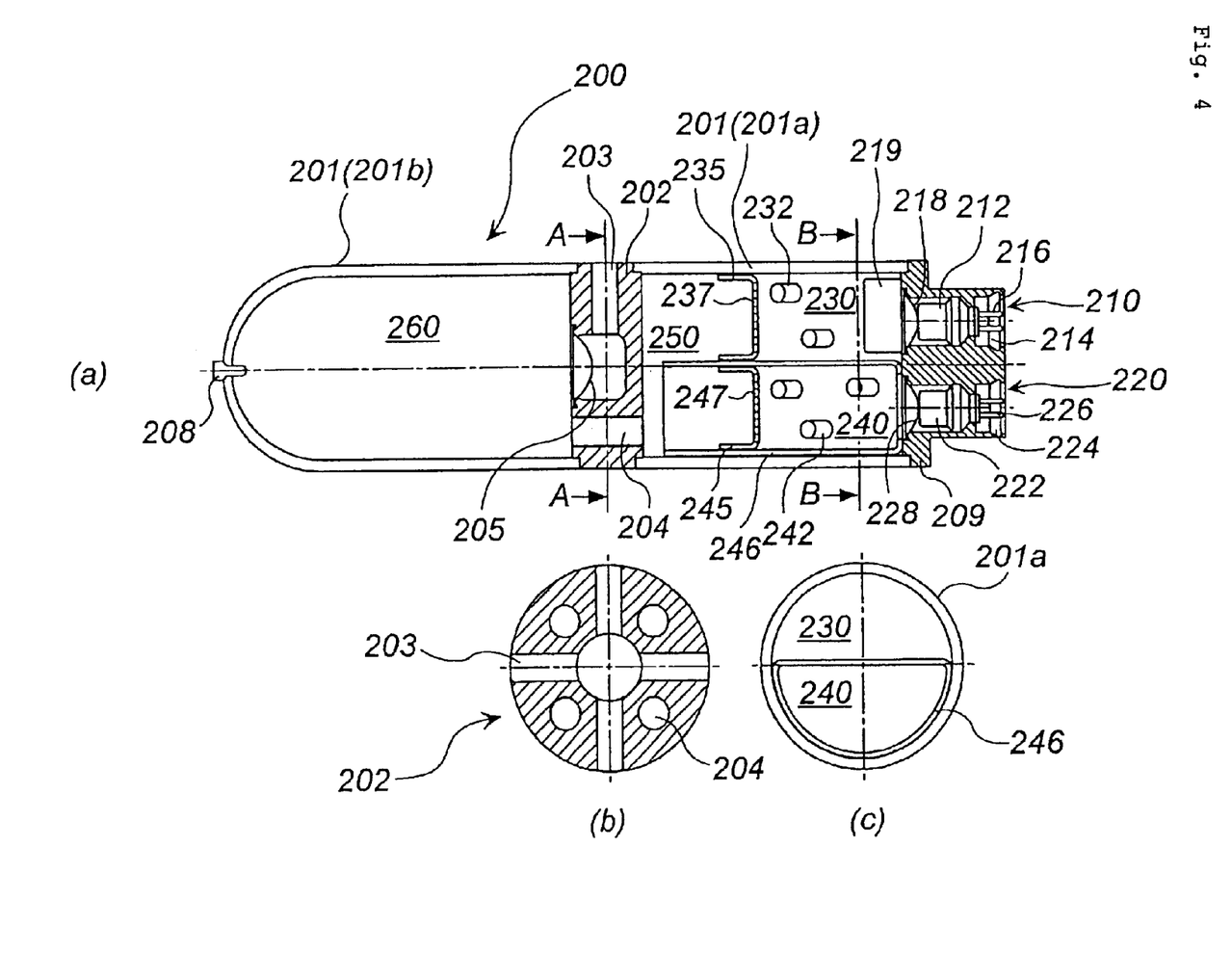
FIG. 4 is an axial sectional view of a hybrid inflator according to another embodiment of the present invention.

Next, another embodiment of the present invention will be explained with reference to the drawings. FIG. 4(a) is an axial sectional view of a hybrid inflator of the present invention, FIG. 4(b) is a sectional view cut along A—A in the direction shown by the arrows in FIG. 4(a), and FIG. 4(c) is a sectional view cut along B—B in the direction shown by the arrows in FIG. 4(a). FIG. 4(c) is used only for explaining the arrangement of gas generating chambers.

In a hybrid inflator 200 shown in FIGS. 4(a) to 4(c), a cylindrical inflator housing 201 is partitioned into two sections (201a and 201b) by a partition plate 202 provided at the axial center of the inflator housing 201 or in the vicinity thereof, so that a first chamber 250 and a second chamber 260, which are two spaces arranged axially in series, are provided.

The partition plate 202 is fixed to the inflator housing 201 (201a, 201b) by welding (or a screw), and it has four gas discharging holes 203 provided in the radial direction of the partition wall and four gas passages 204 which are provided in a thickness direction thereof to communicate the first chamber 250 and the second chamber 260.

The gas discharging holes 203 are in communication with the second chamber 260 via the principal rupturable plate 205, and the gas discharging holes 203 and the gas passages 204 do not intersect each other. Since the total opening area of the gas discharging holes 203 is set to be smaller than the total opening area of the gas passages 204, the ejection pressure of the mixed gas comprising a pressurized medium and a combustion gas is controlled by the gas discharging holes 203.

The kinds of materials constituting the inflator housing 201 and the partition plate 202 are not particularly limited. In view of welding easiness, however, it is desirable that the materials are the same. For example, stainless steel can be used as the material.

A screen such as a wire mesh for removing foreign matters (for example, fragments of the principal rupturable plate 205) contained in the mixed gas can be arranged at a desired position in the outflow passage for the mixed gas extending from the principal rupturable plate 205 to the gas discharging holes 203. A plurality of the gas discharging holes 203 can be provided at equal intervals or at different intervals over the entire peripheral surface of the partition plate 202.

A first gas generating chamber 230, whose outer shell is formed by the inflator housing 201a, part of a wall of the second gas generating chamber housing 246 and a first retainer 235, is disposed in a first chamber 250 which is one of the spaces formed by partitioning the inflator housing 201 with the partition plate 202, and a required amount of a first gas generating agent 232 is stored in the first gas generating chamber 230. The volume of the first gas generating chamber 230 can be adjusted by axially moving the second retainer 235 in both directions in accordance with an amount of the first gas generating agent 232 to be used.

A required number of first communication holes 237 for discharging a combustion gas generated by combustion of the first gas generating agent 232 are provided in the first retainer 235, and they are opened in the axial direction of the inflator housing 201. The diameter of the first communication hole 237 is adjusted to such a size that the first gas generating agent 232 cannot leak out, and a screen comprising a wire mesh or the like can be disposed inside or outside the first communication holes 237.

A first ignition chamber 210 is formed in a boss 209 mounted to one end of the inflator housing 201, and a first igniter 212 is fitted therein. The numeral 214 denotes a connector and the numeral 216 denotes a conductive pin.

A transfer charge 219 charged into an aluminum container or the like is disposed and fixed in the first gas generating chamber 230 to be correctly opposite to the distal end of the first igniter 212 via a first rupturable plate 218 provided to separate the first gas generating chamber 230 from the first ignition chamber 210.

Further, a second gas generating chamber 240 whose outer shell is formed by the second gas generating chamber housing 246 and the second retainer 245 is disposed in the first chamber 250, and a required amount of a second gas generating agent 242 is stored in the second gas generating chamber 240. The volume of the second gas generating chamber 240 can be adjusted by axially moving the second retainer 245 in both directions in accordance with an amount of the second gas generating agent 242 to be used.

The first gas generating chamber 230 and the second gas generating chamber 240 are separated along the axial direction as shown in FIG. 4(a), and they are radially adjacent to each other. Further, as shown in FIG. 4(b), the chambers occupy the whole space in a radial sectional view of the inflator housing 201.

A required number of second communication holes 247 for discharging a combustion gas generated by combustion of the second gas generating agent 242 are provided in the second retainer 245, and the holes are opened in an axial direction of the inflator housing 201. The diameter of the second communication hole 247 is adjusted to such a size that the second gas generating agent 242 cannot leak out, and a screen comprising a wire mesh or the like can be disposed inside or outside the second communication holes 247.

A second ignition chamber 220 is formed by the boss 209 mounted to the one end of the inflator housing 201, and a second igniter 222 is fitted therein. The numeral 224 denotes a connector and the numeral 226 denotes a conductive pin.

A second rupturable plate 228 is provided in the second gas generating chamber 240 to separate the second gas generating chamber 240 from the second ignition chamber 220.

In the first chamber 250, the pressurized medium is charged with a high pressure in a space including the first gas generating chamber 230 and the second gas generating chamber 240, and the space is maintained in a high and equal pressure.

A pressurized medium is charged with a high pressure in a second chamber 260 which is the other of the spaces formed by partitioning the inflator housing 201 with the partition plate 202. However, a gas outflow passage extending from the principal rupturable plate 205 to the gas discharging holes 203 is maintained in a normal pressure. The numeral 208 denotes a sealing pin used for closing the charging hole for the pressurized medium.

In this case, the hybrid inflator 200 shown in FIGS. 4(a) to 4(c) is partitioned axially into the first gas generating chamber 230 and the second gas generating chamber 240 by the inflator housing 201a and the second gas generating chamber housing 246. Alternatively, it may be partitioned into two gas generating chambers by disposing a partitioning member (partition wall) such as a rectangular plate in the axial direction. Further, the hybrid inflator can be partitioned into three or four or more gas generating chambers by disposing at least two partitioning members (partition walls) or gas generating chamber housings.

In the hybrid inflator 200 shown in FIGS. 4(a) to 4(c), in addition to the operational effects such as the above-described (1) to (3), the operational effects of the following (4) to (6) can be obtained on the basis of its structure.

(4) In the hybrid inflator 200, since a mixed gas can be discharged from a central portion, a rectifying plate required, at the time of being mounted the air bag system, in a hybrid inflator of a type which discharges the gas from an end portion can be omitted.

(5) In the hybrid inflator 200, the first chamber 250 and the second chamber 260 are in communication with each other via the gas passage 204. Therefore, when the pressurized medium is charged from a pressurized medium charging hole in a manufacturing process, the pressurized medium flows in both of the second chamber 260 and the first chamber 250 via the gas passage 204, so that the pressurized medium can be charged by a single charging work.

(6) Since the mixed gas in the first chamber 250 is discharged always after it flows into the second chamber 260 via the gas passage 204, the mixed gas is properly cooled in a course of such an outflow, so that the temperature of the mixed gas is not only lowered but also a mist contained in the mixed gas is easily solidified.

Figure 5:
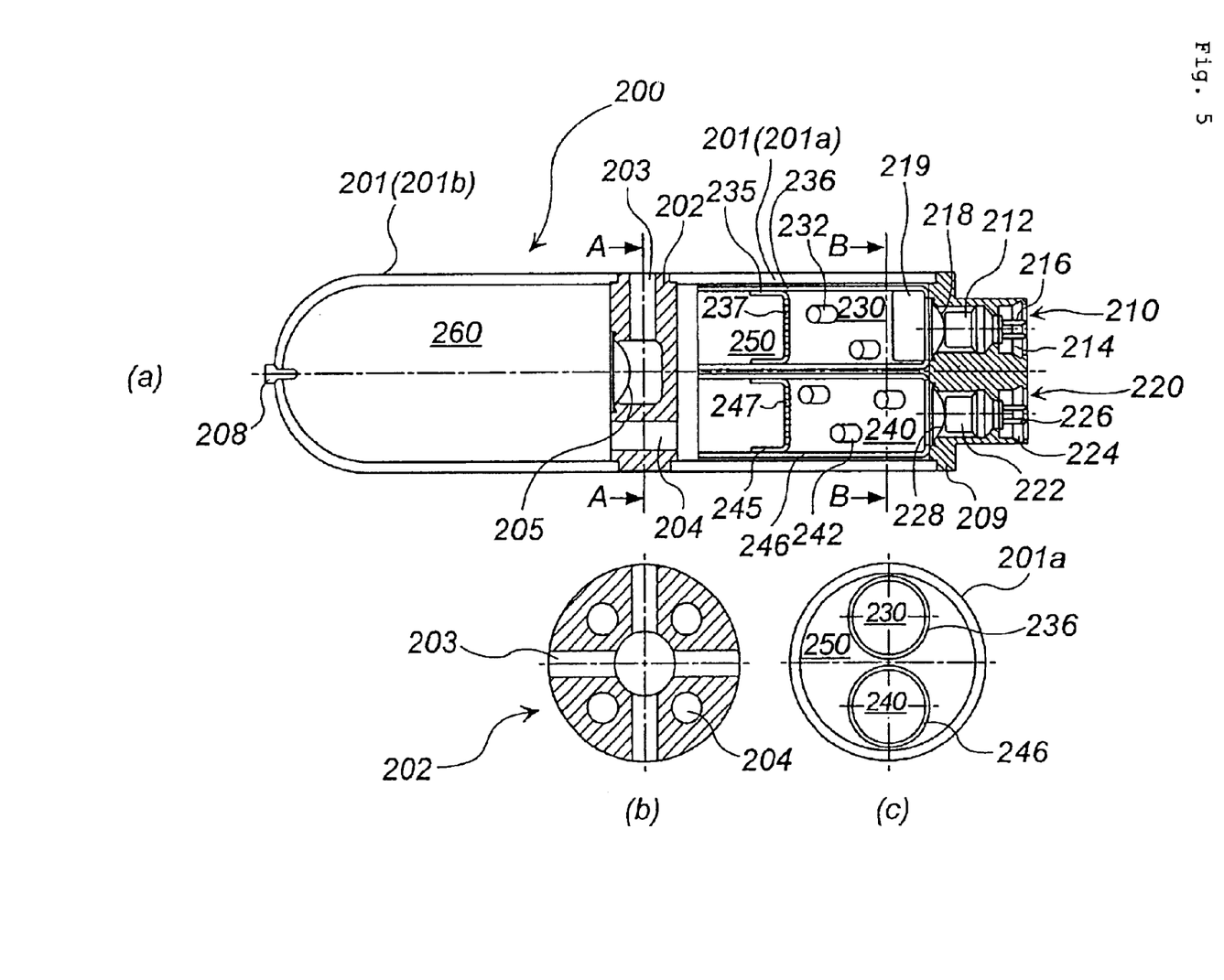
FIG. 5 is an axial sectional view of a hybrid inflator according to another embodiment of the present invention.

An embodiment which is a modification of the hybrid inflator 200 in FIG. 4 will be explained below with reference to FIG. 5. Since a hybrid inflator in FIG. 5 is different from that in FIG. 4 only in the arrangement of gas generating chambers, the same portions other than the above as these in FIG. 5 are denoted by the same numerals. FIG. 5(a) is an axial sectional view of a hybrid inflator of the present invention, FIG. 5(b) is a sectional view cut along A—A in the direction shown by the arrows in FIG. 5(a), and FIG. 5(c) is a sectional view cut along B—B in the direction shown by the in FIG. 5(a). In this case, FIG. 5(c) is used only for explaining the arrangement of the gas generating chambers.

A first gas generating chamber 230 and a second gas generating chamber 240 are provided inside a first chamber 250 which is one of the spaces formed by partitioning an inflator housing 201 with a partition plate 202.

An outer shell of the first gas generating chamber 230 is formed by a first gas generating chamber housing 236 and a first retainer 235, and an outer shell of the second gas generating chamber 240 is formed by a second gas generating chamber housing 246 and a second retainer 245.

As shown in FIG. 4(a), the first gas generating chamber 230 and the second gas generating chamber 240 are separated along the axial direction and they are disposed to have a small gap therebetween in the radial direction. Further, as shown in FIG. 5(c), these chambers occupy only part of the space in a radial sectional view of the inflator housing 201.

In this case, the hybrid inflator 200 shown in FIGS. 5(a) to 5(c) can be partitioned into three or four or more gas generating chambers by disposing three or four or more independent gas generating chamber housings.

In the hybrid inflator 200 shown in FIGS. 5(a) to 5(c), in addition to the operational effects such as the following (1'), the operational effects such as the above-described (4) to (6) can be obtained on the basis of its structure.

(1') Since a volume occupied by the gas generating chambers in the inflator housing 101 is small, the embodiment is suitable for a hybrid inflator in which an amount of the gas generating agent is small and an amount of the pressurized medium is increased.

Further, as another embodiment of the hybrid inflator 200 shown in FIG. 5, two gas generating chamber housings in the shape shown in FIG. 4(c) (the second gas generating chamber housing 246 in a semi-circular shape) can be used in combination to form a first gas generating chamber and a second gas generating chamber in a halved circle shape. In this case, two gas generating chambers occupy the whole space in a radial sectional view of the inflator housing.

Figure 6:
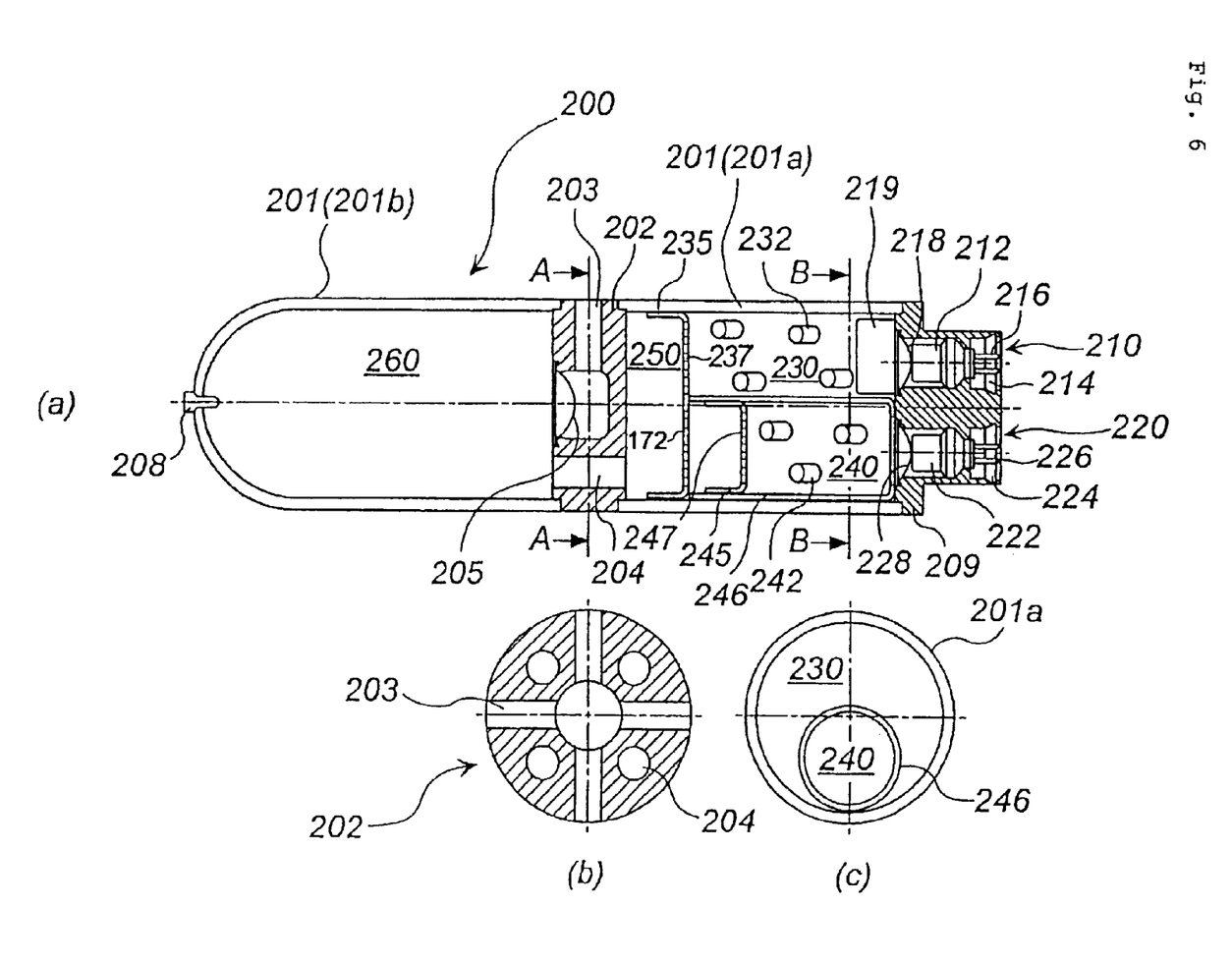
FIG. 6 is an axial sectional view of a hybrid inflator according to another embodiment of the present invention.

Another embodiment which is a modification of the hybrid inflator 200 in FIG. 4 will be explained below with reference to FIG. 6. Since a hybrid inflator in FIG. 6 is different from that in FIG. 4 only in the arrangement of gas generating chambers, the same portions as these in FIG. 6 are denoted by the same numerals. FIG. 6(a) is an axial sectional view of a hybrid inflator of the present invention, FIG. 6(b) is a sectional view cut along A—A in the direction shown by the arrows in FIG. 6(a), and FIG. 6(c) is a sectional view cut along B—B in the direction shown by the arrows in FIG. 6(a). In this case, FIG. 6(c) is used only for explaining the arrangement of the gas generating chambers.

A first gas generating chamber 230 and a second gas generating chamber 240 are provided in a first chamber 250 which is one of the spaces formed by partitioning an inflator housing 201 with a partition plate 202.

An outer shell of the first gas generating chamber 230 is formed by an inflator housing 201a, the entire wall of the second gas generating chamber housing 246 and a first retainer 235, and an outer shell of the second gas generating chamber 240 is formed by a second gas generating chamber housing 246 and a second retainer 245.

As shown in FIG. 6(a), the first gas generating chamber 230 and the second gas generating chamber 240 are separated along the axial direction, and the second gas generating chamber 240 is disposed to be enclosed by the first gas generating chamber 230. Further, as shown in FIG. 6(b), the chambers occupy the whole space in radial sectional view of the inflator housing 201.

In this case, the hybrid inflator 200 shown in FIGS. 6(a) to 6(c) can be partitioned to three or four or more gas generating chambers by disposing one or at least two independent gas generating chamber housings separately.

In the hybrid inflator 200 shown in FIGS. 6(a) to 6(c), the operational effects such as the above-described (1) to (6) can be obtained on the basis of its structure.

Next, the operation of the hybrid inflators 200 shown in FIG. 4 to FIG. 6 will be explained. Although the first igniter 212 and the second igniter 222 can be activated simultaneously, in this case, a case such that the first igniter 212 is first activated and the second igniter 222 is activated with a delay from the activation of the first igniter will be explained.

When a vehicle collides, the first igniter 212 is activated and ignited by an activation signal-outputting means to rupture the first rupturable plate 218, and then, the flame-transferring means 219 is ignited and burnt to generate a high-temperature gas (flame). And the first gas generating agent 232 in the first gas generating chamber 230 is ignited and burnt by the flame, thereby generating a high-temperature gas. The high-temperature gas flows out of the first communication holes 172 to form a mixed gas together with the pressurized medium so that the mixed gas is filled in the first chamber 250.

Thereafter, since the mixed gas flows in the second chamber 260 through the gas passage 204 provided in the partition plate 202 to increase the internal pressure in the second chamber, the principal rupturable plate 205 is ruptured rapidly. Consequently, the mixed gas from the first chamber 250 and the pressurized medium in the second chamber are instantaneously ejected from the gas discharging holes 203 through the ruptured principal rupturable plate 205 to inflate an air bag.

The second igniter 222 is activated and ignited with a slight delay from the activation and ignition of the first igniter 212, the second rupturable plate 228 is ruptured, so that the second gas generating agent 242 in the second gas generating chamber 240 is ignited and burnt to generate a high-temperature gas. The high-temperature gas flows out from the second communication hole 247 to form a mixed gas together with the remaining pressurized medium. After the mixed gas flows in the second chamber 260 through the gas passage 204, the mixed gas together with the remaining pressurized medium in the second chamber 260 is ejected from the gas discharging holes 203 via the ruptured principal rupturable plate 205 to further inflate the air bag.

Next, an air bag system of the present invention will be explained. Any one of the hybrid inflators of FIG. 1 to FIG. 6 can be applied to the air bag system of the present invention. However, the following is a description of a case such that the hybrid inflator 200 shown in FIG. 4 to FIG. 6 is used.

Figure 7:
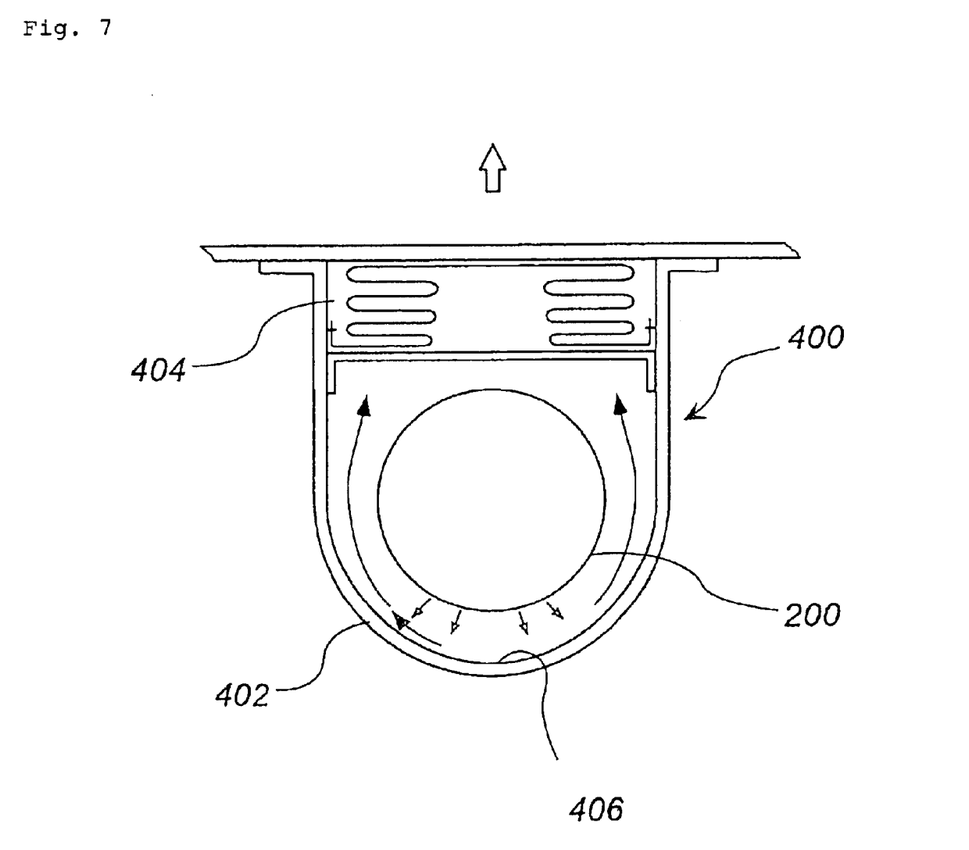
FIG. 7 is a conceptual diagram for explaining an air bag system of the present invention.

First, one embodiment of the air bag system will be explained with reference to FIG. 7. FIG. 7 is a conceptual diagram of an air bag system in a widthwise direction (a direction corresponding to the radial direction of the hybrid inflator 200 assembled in the system). The white arrow in FIG. 7 shows a developing direction of an air bag, namely a direction where a passenger exists, and the arrows shows ejecting directions of a mixed gas.

An air bag system 400 comprises an activation signal-outputting means including an impact sensor and a control unit, and a module in which the hybrid inflator 200 and an air bag 404 are accommodated in a module case 402. The hybrid inflator 200 is connected to the activation signal outputting means (the impact sensor and the control unit) in the first igniter 212 and second igniter 222 side to be fixed inside the module case 402 mounted with the air bag 404. At this time, the gas discharging holes 203 of the hybrid inflator 200 do not face the air bag 404, preferably the holes are arranged in the opposite side of the air bag 404 to face an inner wall 406 of the module case 402. In the air bag system 400 having such a structure, an amount of a generated gas can be adjusted in accordance with the magnitude of the impact by appropriately setting an activation-signal outputting condition of the activation signal-outputting means, and therefore, the inflating speed of the air bag 404 can be adjusted.

In the air bag system 400, since the mixed gas is ejected from the central portion of the hybrid inflator 200, it is unnecessary to dispose a rectifying plate inside the module case 402. Also, a common specification can be employed regardless of whether a vehicle is a right steering wheel vehicle or a left steering wheel vehicle.

Further, in the air bag system 400, by a certain arrangement of the gas discharging holes 204, as illustrated, by mounting the hybrid inflator 200 to make the orientation of the gas discharging holes 203 face the inner wall 406, the ejected mixed gas can strike the inner wall before flowing into the air bag 404. With this, the temperature of the mixed gas can be lowered correspondingly.

Figure 8:
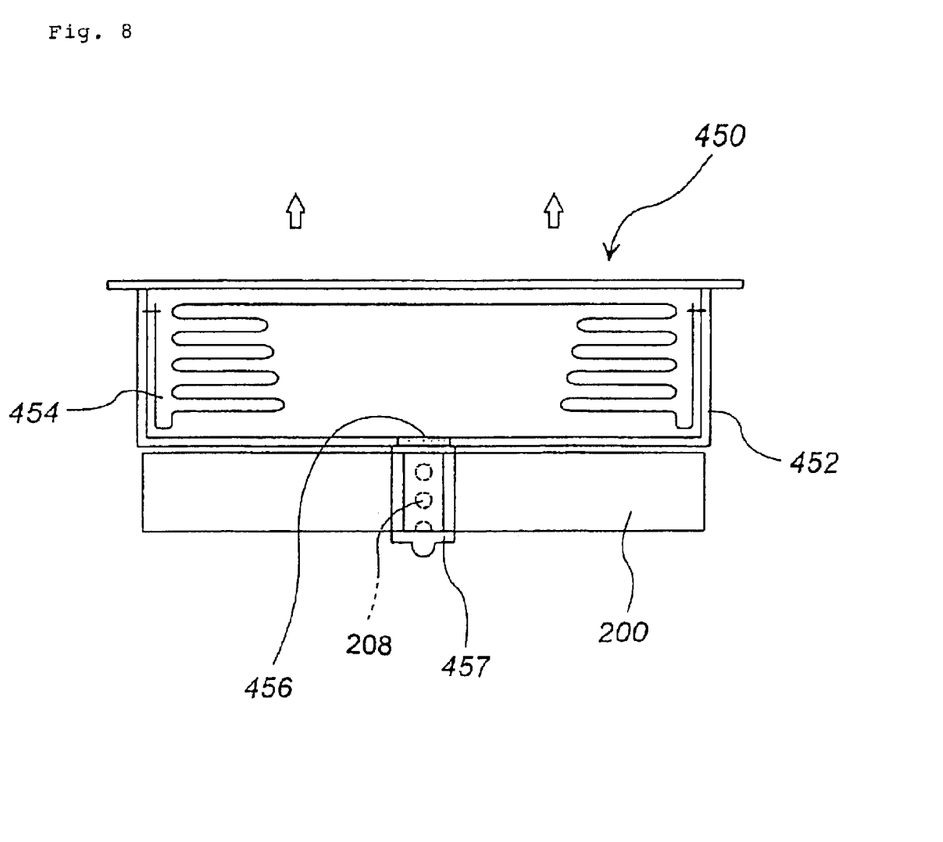
FIG. 8 explains a conceptual diagram in the plain view direction of another air bag system of the present invention.

FIG. 8 shows an air bag module including a module case 450 and a hybrid inflator 200. The hybrid inflator 200 is the inflator disclosed in FIGS. 4, 5 and 6, which includes a partition plate 202 provided in an intermediate portion between both ends of an inflator housing 201. The module case 450 has a container 452 for accommodating therein an air bag 454. The container 452 further includes a port 456, which is a center portion of a backplate in the container 452.

Figure 9:
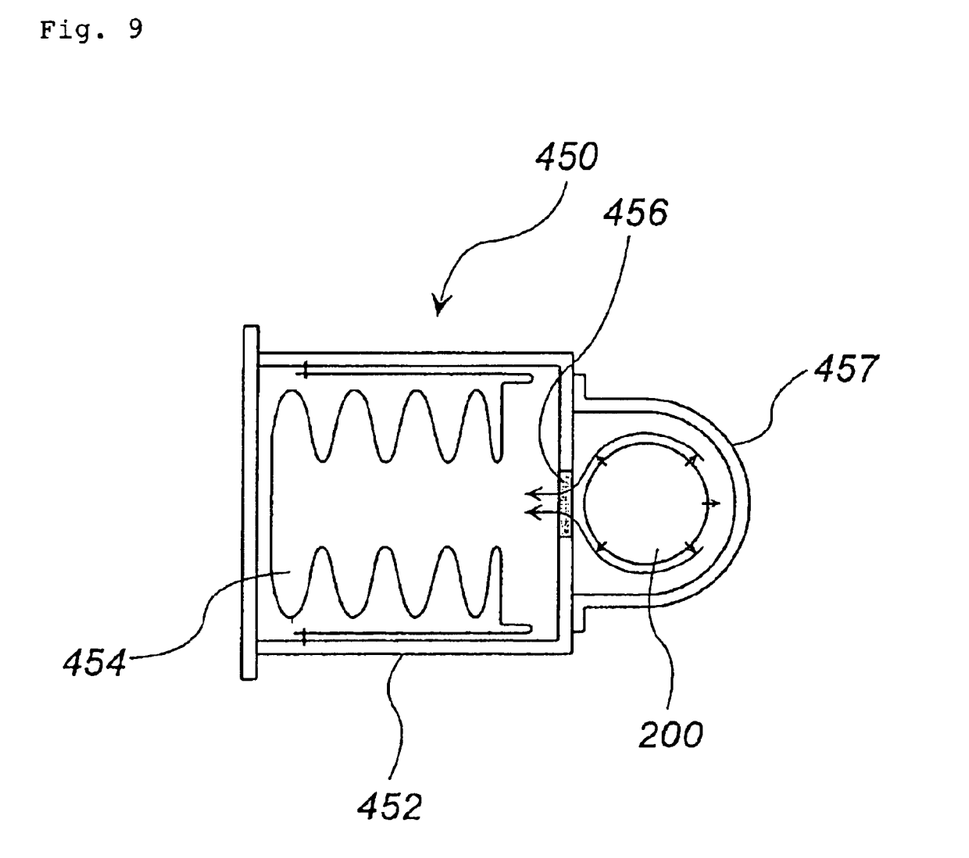
FIG. 9 is a conceptual diagram in a side direction of the air bag system in FIG. 8.

The hybrid inflator 200 is provided in an outside of the module case 450, which is different from an arrangement of the inflator 200 and the module case 402 of FIG. 7. The hybrid inflator 200 in FIG. 8 is attached to the module case 450 by an attaching member 457 such that the attaching member 457 surrounds a gas discharging hole 203 and a space defined by the attaching member 457 and inflator 200 becomes a gas passage to communicate with the air bag 454, as shown in FIG. 9. When the hybrid inflator 200 operates, an inflation gas generated from the gas discharging hole 203 of the hybrid inflator 200 enters the space, and then, as shown in FIG. 9, passes through the port 456 into the module case 450. Because of the location of the port 456, the inflation gas is provided in the air bag 454 uniformly, the airbag is inflated evenly.

What is claimed is:

1. A multistage inflating-type hybrid inflator comprising:
    an inflator housing;
    a first gas generating chamber disposed within said inflator housing and including a first gas generating agent provided therein, said first gas generating chamber connected to a first igniting chamber that includes a first igniter therein;
    a second gas generating chamber disposed within said first gas generating chamber and including a second gas generating agent provided therein, said second gas generating chamber connecting to a second ignition chamber that includes a second igniter therein;
    a pressurized medium charged in said inflator housing except for the first ignition chamber and the second ignition chamber;
    a diffuser portion having a gas discharging port provided at one end of the inflator housing; and
    a principal rupturable plate closing an outflow passage of the pressurized medium between the diffuser portion and the inflator housing.

2. The multistage inflating-type hybrid inflator according to claim 1, wherein said first gas generating chamber is formed by a first gas generating chamber housing provided in said inflator housing, and a second gas generating chamber is formed by a second gas generating chamber housing provided in the first gas generating chamber housing.

3. The multistage inflating-type hybrid inflator according to claim 1, wherein said first gas generating chamber is defined by the inflator housing and said second gas generating chamber is defined by a gas generating chamber housing provided inside the inflator housing.

4. The multistage inflating-type hybrid inflator according to any one of claims 1 to 3, wherein said first gas generating chamber and said second gas generating chamber are eccentrically provided in said inflator housing with respect to an axial direction of said inflator housing.

5. A multistage inflating-type hybrid inflator comprising:

an inflator housing;

a partition wall having a first side and a second side, and provided within said inflator housing for axially dividing an interior of said inflator housing into a first space defined by the first side and a second space defined by the second side, said partition wall including a gas passage penetrating from the first side to the second side for connecting the first space and the second space, and being provided solely with a single opening connected to an outflow passage of said pressurized medium, the solely single opening being provided in the second side:

a first gas generating chamber disposed within the first space and including a first gas generating agent provided therein, said first gas generating chamber connected to a first ignition chamber that includes a first igniter therein;

a second gas generating chamber disposed within the first space such that said second gas generating chamber is aligned to be parallel to said first gas generating chamber, and including a second gas generating agent provided therein, said second gas generating chamber connected to a second ignition chamber that includes a second igniter therein;

a pressurized medium charged in said inflator housing except for the first ignition chamber and the second ignition chamber; and a principal rupturable plate closing the solely single opening.

6. The multistage inflating-type hybrid inflator according to claim 5, wherein said first gas generating chamber and said second gas generating chamber are defined by a first gas generating chamber housing and a second gas generating chamber housing provided in the inflator housing independently.

7. The multistage inflating-type hybrid inflator according to claim 5 wherein said first gas generating chamber is defined by the inflator housing, the second gas generating chamber is provided inside said first gas generating chamber.

8. The multistage inflating-type hybrid inflator according to any one of claims 5 to 7, wherein the partition wall is provided at an intermediate portion between both ends of the inflator housing.

9. The multistage inflating-type hybrid inflator according to any one of claims 5 to 7, wherein the gas discharging port is provided in a radial direction of the partition wall such that the outflow passage communicates only with the gas discharging port, the gas passage is provided in an axial direction of the partition wall such that the gas passage communicates only with the first space and the second space.

10. The multistage inflating-type hybrid inflator according to any one of claims 5 to 7, wherein the gas discharging port includes a plurality of gas discharging ports that are provided in at least a portion of a peripheral surface of the partition wall.

11. The multistage inflating-type hybrid inflator according to claim 10, wherein the gas discharging ports are provided in a half or less of the peripheral surface.

12. The multistage inflating-type hybrid inflator according to any one of claims 5 to 7, wherein the total opening area of the gas discharging port is set to be smaller than the total opening area of the gas passage.

13. The multistage inflating-type hybrid inflator according to any one of claims 1–3 and 5–7, wherein the pressurized medium is charged from only one part of the inflator housing.

14. The multistage inflating-type hybrid inflator according to any one of the claims 1–3 and 5–7, further comprising:

an activation signal-outputting means;

an impact sensor sensing an impact;

a module case accommodating the multistage inflating-type hybrid inflator; and an air bag wherein said activation signal-outputting means, impact sensor, module case, multistage inflating-type hybrid inflator, and an air bag are included within an air bag system.

\* \* \* \* \*